United States Patent

Azima

[11] Patent Number: 6,062,077
[45] Date of Patent: May 16, 2000

[54] TECHNIQUES FOR MAKING AND USING A SENSING ASSEMBLY FOR A MASS FLOW CONTROLLER

[76] Inventor: Faramarz Azima, 376 9th St., Montara, Calif. 94037

[21] Appl. No.: 08/953,715

[22] Filed: Oct. 17, 1997

[51] Int. Cl.[7] ...................................................... G01F 1/68
[52] U.S. Cl. ................................................... 73/204.27
[58] Field of Search ............................. 73/204, 204.27, 73/204.25, 204.26

[56] References Cited

U.S. PATENT DOCUMENTS

| | | | |
|---|---|---|---|
| 3,945,252 | 3/1976 | Fiore | 73/204 |
| 4,440,021 | 4/1984 | Abouchar et al. | 73/204 |
| 4,484,472 | 11/1984 | Licinit et al. | |
| 4,487,062 | 12/1984 | Olin et al. | |
| 4,517,838 | 5/1985 | Wachi et al. | |
| 4,519,246 | 5/1985 | Hartemink | |
| 4,548,075 | 10/1985 | Mariano | |
| 4,569,504 | 2/1986 | Doyle | 251/129.15 |
| 4,667,153 | 5/1987 | Doyle | 324/130 |
| 4,684,886 | 8/1987 | Doyle | 324/132 |
| 4,686,856 | 8/1987 | Vavra et al. | 73/204 |
| 4,687,020 | 8/1987 | Doyle | 137/486 |
| 4,790,182 | 12/1988 | Takahashi et al. | 73/204.27 |
| 4,815,280 | 3/1989 | Tujimura et al. | |
| 4,858,643 | 8/1989 | Vavra et al. | 137/486 |
| 4,928,048 | 5/1990 | Doyle | 318/644 |
| 5,080,131 | 1/1992 | Ono et al. | 137/599 |
| 5,141,021 | 8/1992 | Shimomura et al. | 137/486 |
| 5,159,951 | 11/1992 | Ono et al. | 137/486 |
| 5,191,793 | 3/1993 | Drexel et al. | |
| 5,259,243 | 11/1993 | Drexel et al. | |
| 5,347,861 | 9/1994 | Satoh | |
| 5,398,549 | 3/1995 | Suzuki | 73/204.26 |
| 5,447,173 | 9/1995 | Kazama et al. | 137/8 |
| 5,792,952 | 8/1998 | Ritchart | 73/204.27 |

FOREIGN PATENT DOCUMENTS

| | | |
|---|---|---|
| WO92/20006 | 11/1992 | WIPO |
| WO94/09344 | 4/1994 | WIPO |

*Primary Examiner*—Benjamin R. Fuller
*Assistant Examiner*—Jewel V. Thompson
*Attorney, Agent, or Firm*—Townsend and Townsend and Crew LLP

[57] ABSTRACT

The present invention provides a technique for making a sensing assembly for use in a mass flow controller. The technique includes providing separating terminals between windings on a sensor tube. The separating terminals allow secure and reliable electrical connections to be made to wire wound on the sensor tube, and act as standoffs that support the sensor tube about an insulative form.

26 Claims, 5 Drawing Sheets

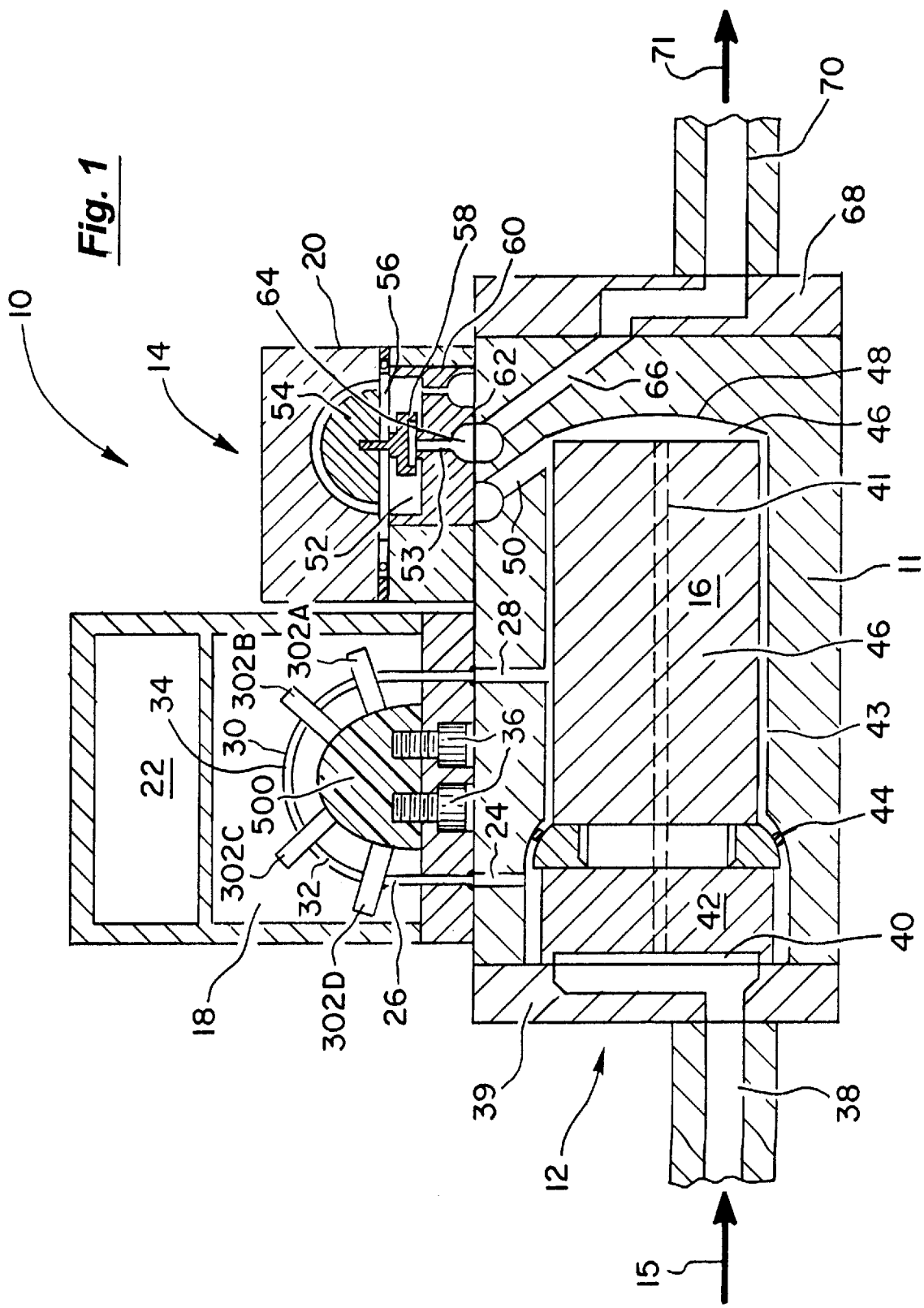

Fig. 3
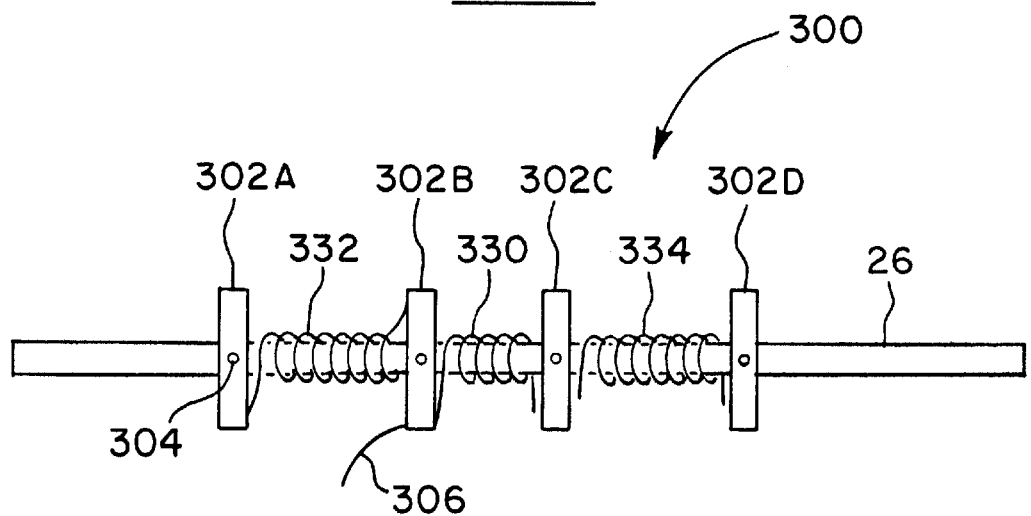
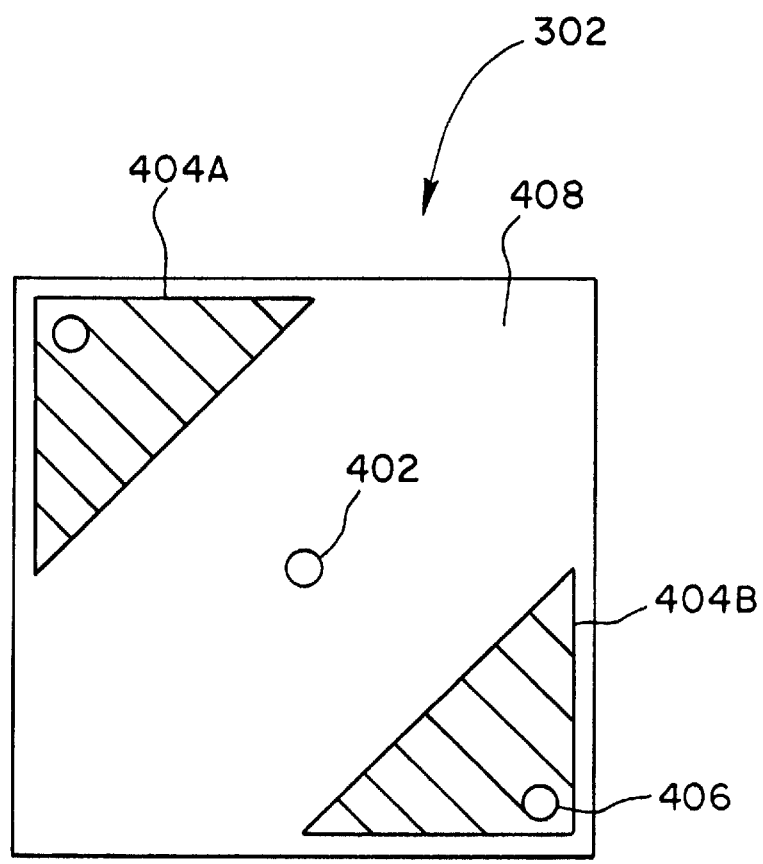
Fig. 4

TECHNIQUES FOR MAKING AND USING A SENSING ASSEMBLY FOR A MASS FLOW CONTROLLER

BACKGROUND OF THE INVENTION

The present invention relates to a mass flow controller, commonly termed MFC. More particularly, the present invention provides a novel technique including a device and method for maintaining a fluid flow rate of fluids used in, for example, semiconductor processing or the like. Merely by way of example, the present invention is illustrated using a device and methods related to integrated circuit processing. But it will be recognized that the present invention also can be applied to the manufacture of products such as flat panel displays, hard disk drives, and others.

In the manufacture of semiconductor integrated circuits, process complexity and wafer size tend to increase with time. For instance, wafer size has increased from one inch up to six inches over the past thirty years. Larger sized wafers such as eight inch are now being used. Twelve inch wafers and larger are being proposed. As wafer size and complexity of processing increase, gases used for the manufacture of the integrated circuits also become more important. In particular, control of a selected flow rate range for a process step (e.g., plasma etching ("PE") and chemical vapor deposition ("CVD")) becomes rather important. Accordingly, mass flow controllers have been used to selectively control fluid flow rates of selected process steps.

Conventional MFCs generally have a main flow chamber, or bypass, and a sensing assembly. A sensing assembly is a part of the mass flow controller that measures, or senses, a typically small amount of the total gas flowing through the MFC. The amount of gas flowing through the sensing unit can be calibrated to the total gas flow through the MFC. MFCs use the thermal properties of a gas to measure the mass flow rate. The basic principle is that each gas molecule has a specific heat capacity, which is generally insensitive to changes in temperature or pressure.

The sensing assembly typically includes a relatively thin sensor tube though which the gas flows, a heater to heat the gas in the sensor tube, and a temperature measuring devices, or sensors, deployed on either side of the heater to provide a differential temperature reading that corresponds to the heat transport of the mass of a particular gas flowing through the sensor tube.

Accuracy and response of the sensor assembly is important for good flow control. For accuracy, it is desirable that the differential temperature reading arise from the heat transferred through the sensor tube by the fluid, and not arise from other sources, such as heat traveling down the sensor tube, heat conducted from the heater to the sensor through the media surrounding the sensor tube, or heat arriving at the sensor from another source, such as the bypass. The response of the sensor assembly relates to the speed with which the sensor assembly heats up or cools down after a change in heater power. Quicker response allows the flow to be controlled within finer limits. Some MFCs have added insulation around the sensor assembly to reduce the effects from external heat sources, but such insulation adversely affects the response of the sensor assembly.

The heater and temperature sensor are both typically made by winding a wire around the sensor tube to form a heater coil and sensor coils. Electric current flowing through the heater coil heats the sensor tube and the gas inside the sensor tube. The flow of gas from the heated zone of the sensor tube to the downstream sensor coil creates a temperature differential between the downstream sensor coil and the sensor coil that is upstream from the heater.

Typical sensor coils operate on the principle that the resistance of a metal increases with increasing temperature. The sensor coils are connected to electronic circuits that measure the resistance of each coil. The longer and thinner the wire of a sensor coil is, the higher the coil's resistance will be and, generally speaking, the greater the coil's temperature sensitivity will be. Increased temperature sensitivity allows more accurate and more stable control of the gas flow, so it is desirable to make the coils out of fine wire. However, it is difficult to make reliable electrical connections to fine wire, as such wire may break, either during assembly or during use, for example from vibrational stresses.

From the above, it is seen that a MFC with an improved sensing element that is easier to make, more reliable, more accurate, or more responsive is desirable.

SUMMARY OF THE INVENTION

According to the present invention, a technique including a device and method for an MFC using an improved sensor assembly is provided.

In a specific embodiment, the present invention provides an MFC that includes a sensor assembly that supports a sensor tube with terminal boards. Heating and sensing coils are wound around the sensor tube from fine niachrome wire, and the ends of the wires are soldered to electrodes on the terminal boards. Harness wires are also soldered to the terminal boards.

In a further embodiment of the invention, two terminal boards define a bobbin-type structure with the portion of the sensor tube between the terminal boards. This structure allows a coil to be wound within the confines of the terminal boards. The terminal boards have electrodes on each side, the electrodes on opposite sides of the terminal board being electrically connected together with a conductive via, such as a plated through-hole. The relatively fine coil wire was soldered to one electrode, and harness wire, which is thicker, was soldered to the complimentary electrode on the opposite side of the terminal board. The conductive via electrically couples the coil wire to the harness wire.

In yet a further embodiment, the terminal boards act as standoffs to hold the tube at a selected height above a form. The form supports the tube by the standoffs/terminal boards, resulting in a curved tube without kinks or folds that might impede flow through the tube. The form also provides thermal insulation between gas flowing in the bypass section of the MFC and the sensor tube without significantly affecting the response of the sensor assembly. This results in an MFC with improved accuracy and stability.

A further understanding of the nature and advantages of the present invention may be realized by reference to the following specification and attached drawings.

BRIEF DESCRIPTION OF THE DRAWINGS

FIGS. 1–1A are simplified side-view diagrams of a fluid or mass flow controller according to the present invention;

FIG. 3 illustrates a sensor tube with a terminal board, according to one embodiment of the present invention;

FIG. 4 illustrates a terminal board with electrodes;

DESCRIPTION OF A SPECIFIC EMBODIMENT

Figure 1A:
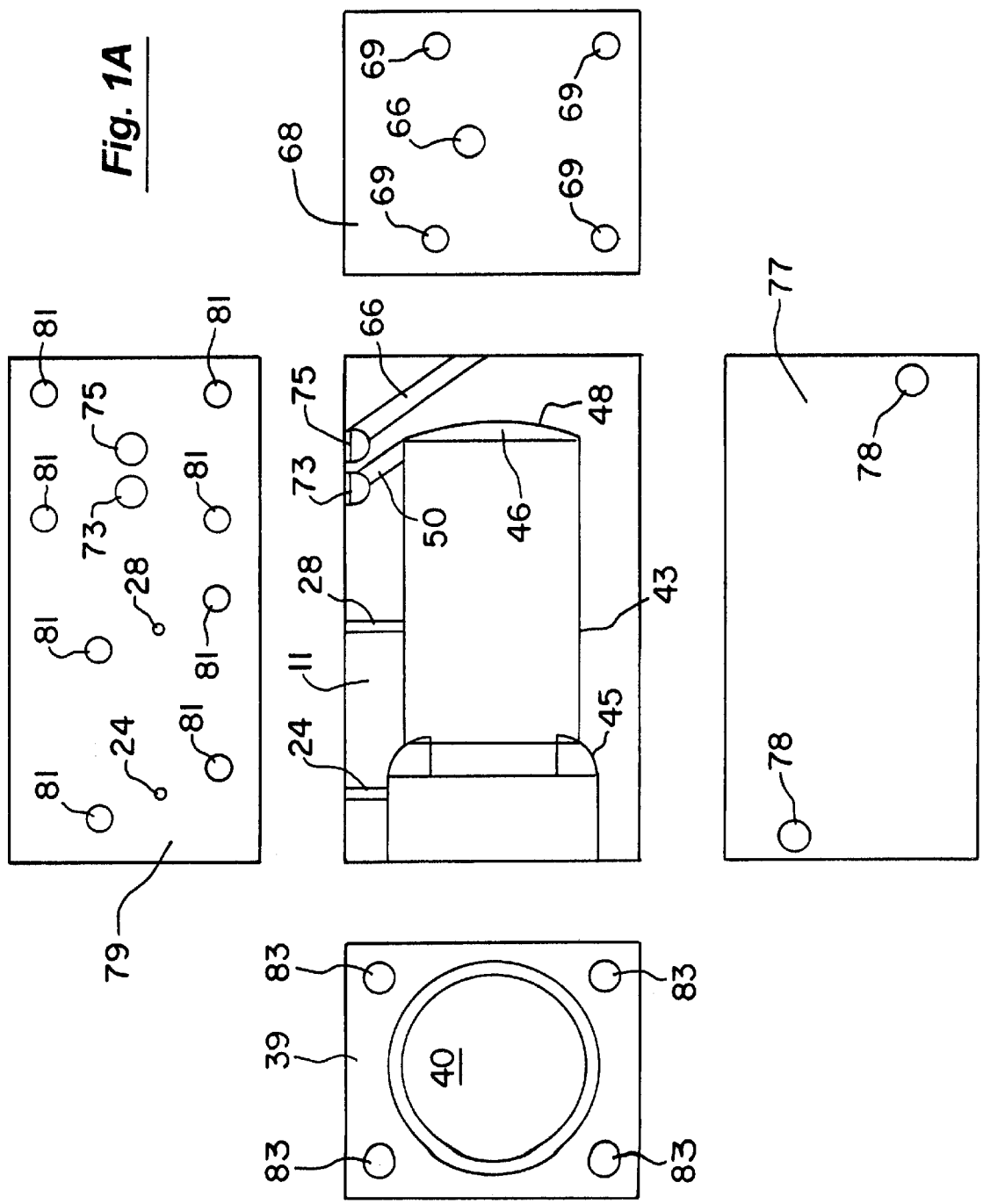

The present invention provides a technique, including a device, a method for making the device, and an MFC apparatus incorporating the device, for maintaining a fluid flow rate of fluids used in, for example, semiconductor processing or the like. In an embodiment, the present invention provides a device capable reliably sensing the flow of a gas through a tube. In an alternative embodiment, the present invention provides a technique for fabricating a sensor assembly of a mass fluid flow controller, which uses a terminal board to hold the sensor tube above an insulating form and which provide electrodes for connecting the sensor and heater wires.

1. Present Mass Flow Controller

Mass flow controllers, commonly termed MFCs, are used whenever accurate measurement and control of a gas(es) is desired. MFC includes a mass flow meter, a proportional controller, and other elements. FIG. 1, for example, illustrates simplified side-view diagrams of a mass or fluid flow controller 10 according to the present invention. This diagram is merely an illustration and should not limit the scope of the claims herein. One of ordinary skill in the art would recognize other variations, alternatives, and modifications.

The MFC 10 generally includes a mass flow meter 12, a controller 14, and other elements. The mass flow meter 12 divides fluid flow 15 between a flow restriction element or by-pass element 16, where most of the flow passes, and sensing tube 26, where mass flow is measured. Sensing tube 26 is located in a sensing unit 18. Controller 14 includes, among other elements, a variable displacement solenoid valve 20 and control electronics 22. The controller 14 drives the valve to a position so that measured flow equals a desired flow 71 set-point for a particular process. In operation, for example, fluid 15 flows into the MFC through inlet 38. Inlet 38 couples to end-cap 39, which seals one end of housing or main body 11. Fluid flows through an orifice in end-cap 39 into chamber 40, which couples to by-pass element 16. By-pass element 16 includes one or more laminar flow tube(s) 41, which allows fluid to flow in a laminar manner through the by-pass element 16.

By-pass element 16 is generally removable from the main chamber 43 of the main body 11. In particular, by-pass element 16 is insertable into the main chamber 43 when end-cap 39 is not present. By-pass element 16 is replaceable or detachable from the main chamber 43 in the main body 11 by removing end-cap 39, which holds and seals the by-pass element 16 into place of the main body 11. By-pass element also includes region 42 for holding or clustering one or more of the laminar flow tubes into the by-pass element. Region 44 of the by-pass element includes an annular periphery (i.e., rounded corners) to seal the by-pass element to the main chamber 43 of main body 11. Fluid traverses through one or more of the laminar flow tubes and exits into chamber 46, which is coupled to valve 20 through orifice 50. Chamber 40 may have an annular or concave structure 48 (e.g., rounded) to facilitate fluid flow from one or more laminar flow tubes to the orifice 50.

By-pass element 16 also has a relatively long elongated structure for providing a wide range of fluid flow ranges. By-pass element 16 makes effective use of the main body by extending into a region underlying the sensing unit 20. In some embodiments, by-pass element takes up a length greater than about 70%, 80%, 90%, or 95% of the length of the main body 11. More preferably, by-pass element takes up a length greater than about 90% of the length of the main body. In most embodiments, main body includes a length of about five, four, or three and one-half, or preferably three inches and less, but can be greater. This length generally allows the main body or the MFC to be placed in process lines between a source gas and a processing chamber. Additional details regarding the by-pass element are described below.

Sensing unit 18 is coupled to the main body 11 by way of orifice 24 and orifice 28. Sensing unit 18 is also coupled mechanically to main body 11 using, for example, fasteners 36, e.g., screws, bolts. A portion of fluid flows from region 42 of the by-pass element into orifice 24. Orifice 24 is an annular region which provides fluid into sensing tube 26. Sensing unit also includes temperature sensing elements 32 and 34 for monitoring a difference in temperature between orifice 24 and orifice 28. Additionally, sensing unit includes heater element 30, which is often a resistive coil, for adding heat to the fluid through the periphery of the sensing tube 26. Fluid leaves sensing unit 18 through orifice 28 and enters by-pass element 16. It is understood that the fluid flow through the bypass, and hence through the sensor tube, could be reversed.

Fluid leaves by-pass element through orifice 50 and enters valve 20, which selectively adjusts fluid flow to a desired set-point. Fluid leaves orifice 50 and enters chamber 52 in the valve 20. From the chamber 52, fluid traverses under valve seat 58, through orifice 53, and out orifice plate 60, which selectively adjusts fluid flow through valve element 64. A combination of at least plunger assembly 54 and valve spring 56 actuates valve element 64 to selectively control fluid flow through the valve. Upon traversing through orifice plate 60, fluid enters and traverses through orifice 66. Orifice 66 allows fluid to enter into a chamber in end-plate 68, which is connected or coupled to outlet 70. Fluid 71 exits from outlet 70 to, for example, a processing chamber or the like. The processing chamber can be, among others, a chamber for etching, a deposition chamber, a sputtering chamber, and an implantation chamber.

As shown, valve 20 couples to by-pass element 16 using orifice 50, for example. Orifice 50 is formed in the main body at an angle from normal to by-pass element flow or the by-pass element itself, which is generally disposed parallel to fluid flow. In particular, orifice 50 provides fluid to flow in a somewhat "backward" manner, since the opening to valve chamber 53 is slightly downstream from chamber 46 of the main body. This slightly backward directing orifice 50 allows for effective utilization of space for the by-pass element in the main body. Alternatively, orifice 50 can be formed into the main body in a variety of other configurations or geometries to effectively use a greater portion of the main body for laminar fluid flow. In relation to the by-pass element, a portion of the laminar flow region of the by-pass element overlaps a region occupied by the sensing unit. That is, by-pass element extends underlying at least a center region of the valve, or preferably underlying a substantial portion of the valve. Of course, depending upon the application, other configurations can also be used to effectively increase the laminar flow region of the by-pass element to provide a greater range of fluid flow.

FIG. 1A illustrates simplified diagrams of the mass flow controller of FIG. 1, according to the present invention. The diagrams include a side view 11 of the main body, a front view of end-cap 39, a front view of end-cap 68, a top plate 79 (or interface plate between main body, and sensing unit and valve unit), and a bottom plate 77. For easy reading, reference numerals used in these diagrams are similar to the ones in FIG. 1, for example. Main body 11 includes the main chamber 43, which houses by-pass element 16. Main body 11 includes an annular region 45. Annular region 45 provides a cylindrical surface (e.g., rounded surface) to seal main chamber 43 to annular region 44 of the by-pass element. Additionally, main chamber 43 includes a cavity 46 with an annular region 48, which facilitates fluid flow from the by-pass element to the sensing unit. The annular region also enhances corrosion prevention. That is, moisture cannot easily accumulate on the "rounded" surface to prevent corrosion from growing on internal edges of the main cavity. Channels or annular regions 24 and 28 are also shown. Furthermore, orifice 50 and orifice 66 which couple the main body to the valve unit are shown. Each orifice 50, 66 connects or is coupled to an opening or larger region 73, 75. This opening or larger region facilitates fluid flow to and/or from each orifice 50, 60.

FIG. 1A also includes a variety of other views of the mass flow controller according to the present invention. End-plate 39 includes cavity 40 and openings 83, which can be used to secure the end-plate to the main body by fasteners, e.g., bolts, screws. End-plate 68 has orifice opening 66 and also has openings 69, which can be used to secure the end-plate to the main body by fasteners, e.g., bolts, screws. A bottom view 77 shows openings 78 for securing purposes to a plate. A top view 79 is also shown. The top view shows orifice openings 24 and 28, which provide fluid flow to the sensing unit. Additionally, top view shows orifice openings 73, 75, which provide fluid flow to the valve. A plurality of openings 81 are used to secure the sensing unit and/or the valve to the main body.

In theory, for example, mass flow meter 12 uses thermal properties of a gas to measure mass flow rate. In particular, mass flow meter generally relies upon a principle that each molecule in a gas has a specific ability to pick up heat. The principle relates to a property of the gas commonly termed the "specific heat" ($C_p$), which is the specific heat at constant pressure. The specific heat relates at least to mass and physical structure of the gas and can be determined experimentally or looked up in a reference book such as, for example, the CRC Handbook of Chemistry and Physics, but is not limited to this reference book. The specific heat is often known for a variety of gases and is, for the most part, insensitive to changes in pressure and/or temperature.

Figure 2:
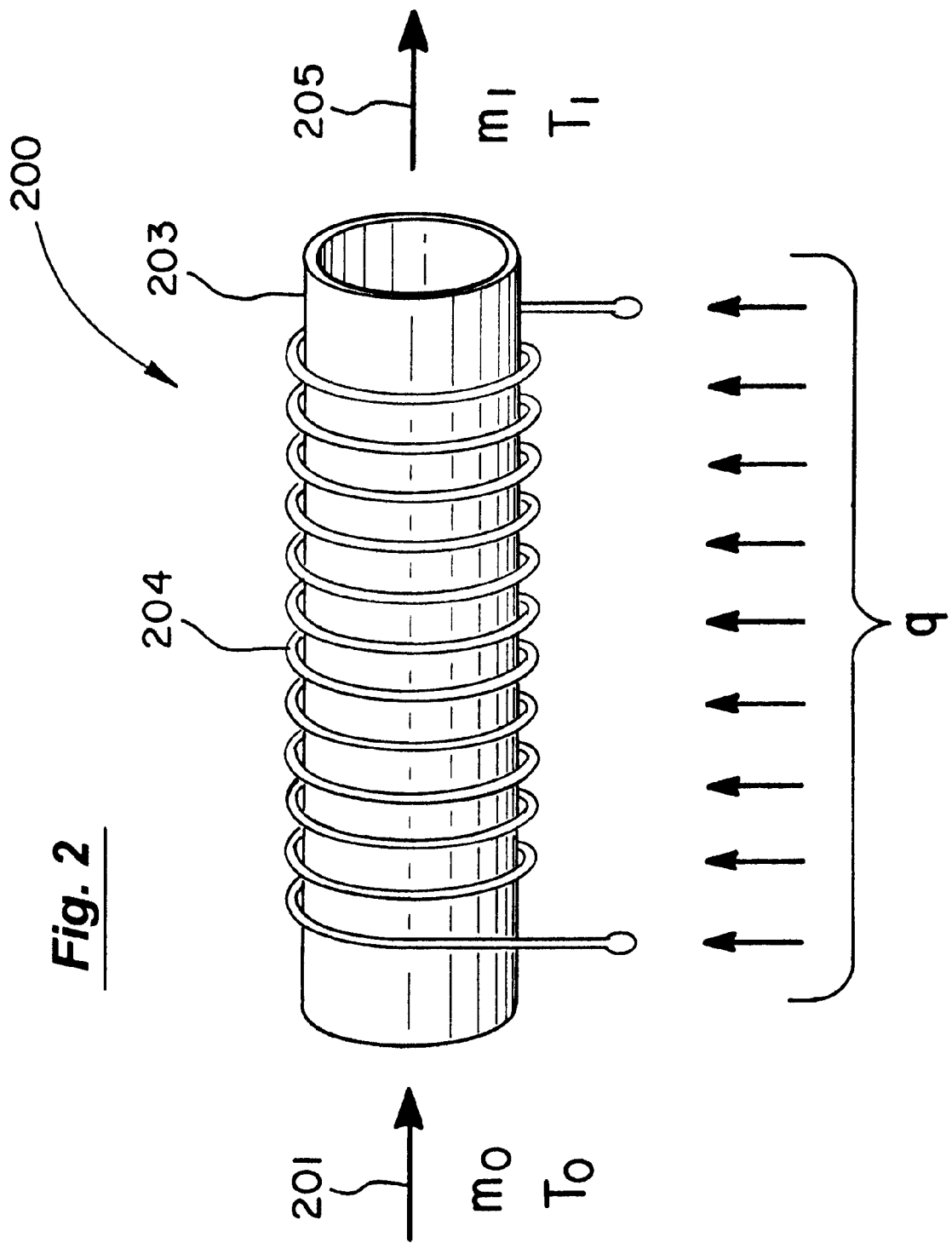
FIG. 2 is a simplified diagram illustrating operation of a mass flow controller according to the present invention.

Mass flow meter 12 operates by adding a selected amount of heat to a gas and monitoring a change in temperature of the gas. By way of the change in temperature and heat, a mass flow rate of the gas can be determined. Referring to FIG. 2, for example, an illustration of mass flow controller operation 200 is depicted. A gas 201 enters sensing tube 203 at an initial temperature ("$T_0$") and mass flow rate ("$m_0$"). Heat ("q") is applied to the tube to increase temperature of the gas in the tube 203. In particular, resistive heat can be applied to tube 203 using resistive heating element 204. Outgoing gas 205 leaves tube at a higher temperature ("$T_1$") and mass flow rate ("$m_1$"). Conservation of mass suggests that incoming mass flow rate $m_0$ is equal to outgoing mass flow rate $m_1$. A relationship between heat, heat capacity, mass flow rate, and change in temperature is governed by the following equation:

$$q = mC_p dt$$

where q is heat applied to the gas in the tube;

m is mass flow rate;

$C_p$ is heat capacity at constant temperature; and dt is differential change in gas temperature.

Referring to the equation, heat (q) applied to the tube 203 can be measured by way of measuring an electric current at a specific voltage applied to the tube. As noted above, the heat capacity ($C_p$) can be found in a reference book such as, for example, the CRC Handbook of Chemistry and Physics, but is not limited to this reference book. Differential temperature (e.g., $T_0$, $T_1$) also can be measured by way of resistivities. Accordingly, mass flow rate (m) in the sensing tube is readily determined by way of the equation.

Total or net mass flow rate for the mass flow controller can be determined by a flow relation between the sensing tube and the by-pass element. As noted, most of the flow shunts through by-pass element and a portion of the flow splits off into the sensing tube in the sensor. A percentage of fluid flow through the sensing tube is relatively constant in relation to the fluid flow through the by-pass element for a selected fluid flow operating range. By way of measuring the fluid flow passing through the sensing tube, total flow can be determined, as long as the percentage of flow between the tubes remains substantially constant. Preferably, fluid flow through the sensing tube has a substantially laminar profile to maintain accurate fluid flow measurement and preserve the relatively constant flow relation between the by-pass element and the sensing tube.

FIG. 3 illustrates a simplified drawing of a portion of the sensor assembly 300. The sensor tube 26 goes through four terminal boards 302A–302D. The terminal boards are square, about 7.6 mm on an edge, and are made from standard printed circuit board material, such as G-3 resin-fiberglass laminate or similar material, approximately 2.54 mm thick, as is well-known in the art. Other materials, shapes, and dimensions may be used.

A first sensor coil 332, a heating element coil 330, and a second sensor coil 334 are wound around the sensor tube 26 between the terminal boards. The sensor and heating element coils are wound from a fine wire, such as niachrome wire that is about 2 mils in diameter, although thicker or thinner wire could be used. Fine wire provides a higher resistance per unit length than thicker wire of the same material. This in turn provides greater sensitivity of the sensor coils and better thermal response. A reason that using finer wire provides better response is that using finer wire reduces the thermal mass of the sensing and heating elements for a given resistance. A lower thermal mass allows the sensing elements to heat up and cool down faster in response to changes in the mass flow through the sensor tube, thus providing quicker and more accurate flow control. The wire is insulated with polyesterimide, although other types of wire, such as iron-based, aluminum-based, or copper-based wire, could be used, as could other types of insulation, such as polyimide. Polyesterimide may be soldered directly without need to first remove the insulation in a separate step.

FIG. 4 is a simplified top view of a terminal board 302. The terminal board 302 has a center opening 402, approximately 3.3 mm in diameter, through which the sensor tube was inserted. The sensor tube may be press-fit into the center hole, or the sensor tube may be further attached to the terminal board with adhesive or the like. A glue hole (FIG. 3) 304 was drilled through an edge of the terminal board to the center hole to accept adhesive, such as an acrylate-based adhesive, an example of which is LOCTITE 380™. Adhering the terminal board to the sensor tube kept the terminal board from spinning during the coil-forming process, which is discussed in further detail below. The terminal board was in the shape of a square, approximately 7.6 mm on a side, although other shapes could be used. All terminal boards were identical, which allowed them to be used in any position along the sensor tube, although different terminal board configurations could be used for the different positions.

The viewed surface of the terminal board 302 shows electrodes 404A and 404B formed on the terminal board. The electrodes were formed using standard printed circuit board fabrication methods and are copper, but could be other types of metal, plated, or tinned. The opposite surface (not shown) of the terminal board has similar electrodes. An unplated field 408 of the terminal board thermally isolates the electrodes from the sensor tube, which was assembled through the center opening 402. It is desirable that the terminal boards conduct negligible heat out of the sensor tube or out of the heating element or sensing coils, so that the terminal boards do not contribute to the thermal mass heated by the heating coil.

A conductive via 406, which in this case is a plated through hole, electrically connects the electrode 404B on the viewed surface to an electrode (not shown) on the opposite surface. The conductive via provides a compact and reliable method of connection between a harness wire (FIG. 3) 306 and a coil wire. By soldering the harness wire to the electrode on the opposite side of the terminal board that the coil wire was soldered to, there was less chance of damaging the relatively fine coil wire. Additional wires (not shown) were connected to other electrodes of the terminal boards. The harness wire 306 was a conventional insulated wire of the type used for soldering to circuit boards, such as multi-strand tinned copper wire with plastic insulation, and connected to the electrode on the terminal board to the MFC sensor circuitry.

The coil winding process will now be explained in reference to FIG. 1. The attachment of terminal boards 302A–302D to the sensor tube 26 formed a bobbin structure. This bobbin structure allows accurate, reliable, and repeatable winding of the sensor coils 32, 34 and heating element coil 30 on a coil winding machine, such as the COIL-WINDER AX-2™ sold by Tanaka Seki Co., Ltd., of Japan.

The first sensor coil 32 and second sensor coil 34 were each wound to be approximately 10 mm long. The heating element coil 30 was wound to be approximately 8 mm long. The separation between each sensor coil and the heating element coil was approximately 3.5 mm, and the overall length of the sensor tube 26 was approximately 59 mm. The sensor tube was a stainless steel tube about 12 mils outside diameter and about 4 mils inside diameter, of the type of tube commonly used for hypodermic needles. A fine sensor tube provides low thermal mass for quicker response and requires less power to be applied by heating element coil to achieve a suitable heating of the mass flow through the sensor tube, thus simplifying the power and control circuitry.

After winding the coils onto the sensor tube, the coil wires were soldered to the electrodes on the terminal boards, an example of which is solder joint 308, FIG. 3. The soldering process removed the polyesterimide insulation from the coil wire. In another process, coil wire with polyimide insulation was used. In that instance, the insulation was removed from the wire with a cotton swab dipped in solvent prior to soldering the wire to the electrode.

Figure 5:
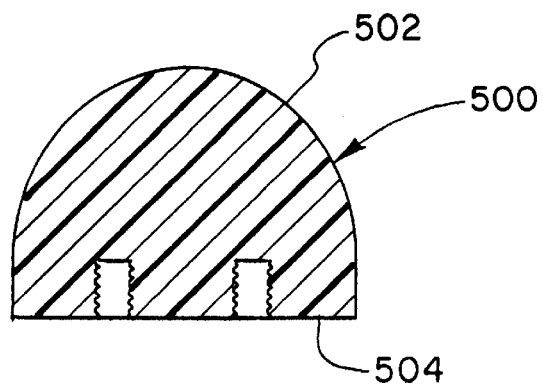
FIG. 5 illustrates a form that was used to support a sensor assembly and connect two half plates together.

FIG. 5 shows a simplified side view of a form 500. The form was about 7.6 mm thick, and provides support for the terminal boards 302A–302D on the curved surface 502, which provide support for the sensor tube 26, as shown in FIG. 1A. A flat surface 504 will sit against two half plates, but could also sit directly on the main body of the MFC or other support structure.

The form was made from G-10 type printed circuit board material and was about 12.7 mm high, although other material that is similarly insulative, structural, and easy to machine could be used. Laminated material is advantageous because the laminations may be oriented in a horizontal aspect, as viewed in FIG. 5, to improve the thermal isolation characteristics while providing good structural strength to hold the two half plates, as discussed below in reference to FIGS. 6A and 6B. The form 500 provides thermal isolation between the bypass 16 of the MFC and the sensor assembly, particularly the sensor tube and sensor coils. Some conventional sensor tubes have relied on insulating material, such as foam, fibers, and foam beads, to surround the sensor tube and isolate the differential temperature gradient formed by the mass flow past the heating element coil from the ambient temperature. These methods share common flaws and do not recognize important aspects of the MFC.

A major heat source or sink in the MFC is the gas flowing through the bypass. In some cases, as with gas from a heated liquid source, the gas may be relatively hot compared to the environment surrounding the sensor assembly. In other cases, as with gas released from a compressed gas source, the gas may be relatively cold. In either event, it is important to thermally isolate the sensor assembly from the bypass, especially as the mass of gas through the bypass increases. The flow through the bypass is typically greater when processing larger wafers, for example. While surrounding the sensor tube with insulation provides some thermal isolation between the bypass and the sensor assembly, it has the disadvantage of adding to the thermal mass of the control system.

Adding thermal mass to the control system increases the response time of the control system because a reduction in power from the heating coil element will not as immediately be reflected in an accurate change in the sensed temperatures. As the power to the heating coil is reduced, heat will still flow from the thermal mass, including the thermal mass of any insulation surrounding the sensor assembly, into the sensor assembly and the gas flow in the sensor tube. Thus, it would take longer for a change in the heating coil output power to be reflected in the sensor coil readings.

As shown in FIG. 1, the sensor tube 26 is supported at only a few points by the terminal boards 302A–302D. Most of the sensor tube is surrounded by air, as are the sensor coils and the heating element coil, allowing rapid thermal response. The form 500 provides thermal isolation between the sensor assembly and the bypass without significantly increasing the thermal mass of the sensor assembly. Appropriate material for the form would have good insulative properties, and also low specific heat, so that the form will not act as a thermal source or sink. In the embodiment shown in FIG. 6B, the form 500 serves support the sensor tube 26 via the standoffs 302A–302D, mechanically couple the two half plates of the assembly 602A, 602B, and also to provide thermal isolation between the sensor tube and the half plates, which will eventually be attached to the main body of the MFC in the region of the bypass. If the form did not perform the function of mechanically coupling the two half plates, it would not need to be as strong, and a different material, such as a foam material or a hollow form, could be used. If the form had sufficiently low conductivity or specific heat capacity, the sensor tube could lie directly on the form without the intervening standoffs.

The form 500 also provides, in conjunction with the terminal boards 302A–302D, mechanical support for the sensor tube 26. The form and terminal boards support the sensor tube in a smooth arc, without kinking the sensor tube, which benefits from the support. This allows fluid to flow smoothly through the sensor tube.

Figure 6A:
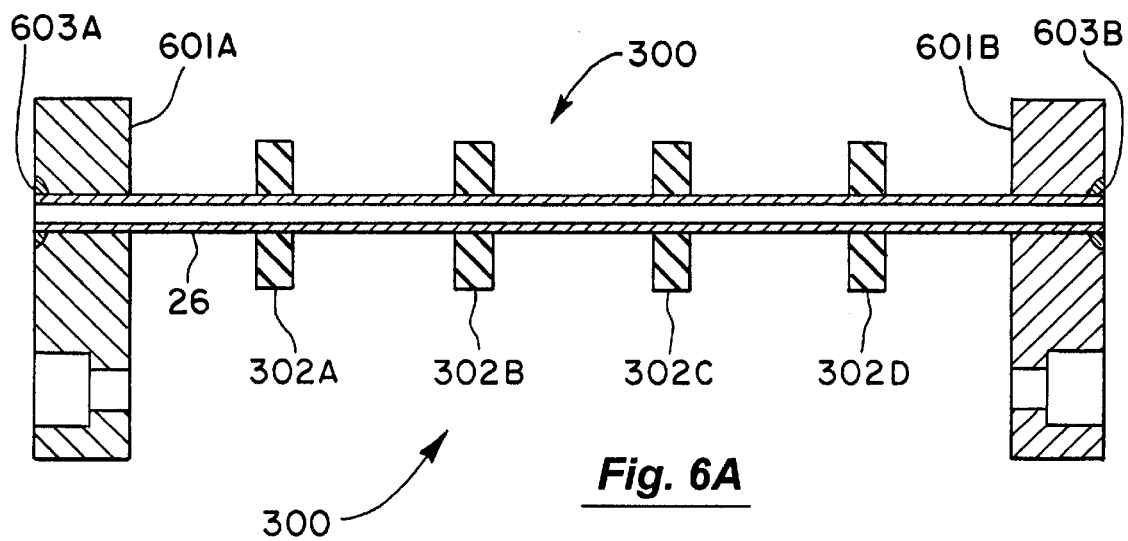
FIG. 6A is a simplified side-view diagram of a sensor assembly attached to two half plates.

FIG. 6A shows a simplified sensor tube assembly after the coils, which are not shown in this view, have been wound and before the sensor tube assembly is fitted to the form. The sensor tube assembly 300 is attached to two half plates 601A, 601B. Each half plate was drilled to accept the sensor tube 26, which was butt welded 603A, 603B to each half plate. The half plates were countersunk and drilled 605 to accept a screw (not shown) that was used to attach each half plate to the form.

Figure 6B:
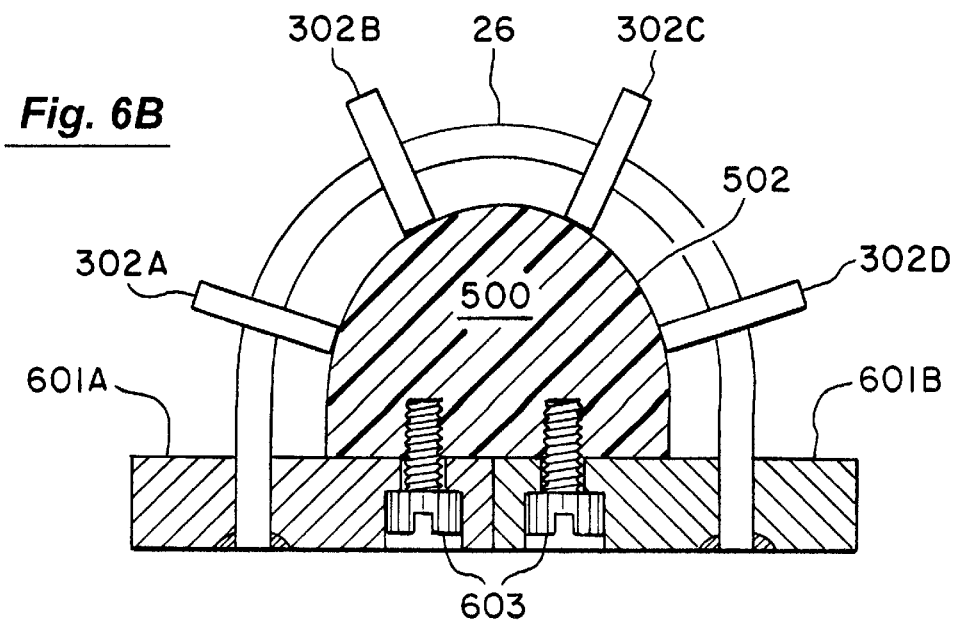
FIG. 6B is a simplified side-view diagram of two half plates attached to a form that supports a sensor tube assembly.

FIG. 6B shows the half plates 601A, 601B attached to the form 500. The shapes of the form 500, the half plates 601A, 601B, and the terminal boards 301A–302D are chosen so that the form provides support for the sensor tube 26 through the terminal boards when the half plates are attached to the form 500 with screws 603. The form not only provides support for the sensor tube, but it also serves to connect the two half plates together. The result is an assembly that is simple to manufacture, repeatable, and robust.

While the above is a full description of the specific embodiments, various modifications, alternative constructions and equivalents may be used. For example, while the description above is in terms of using the MFC for semiconductor processing applications, it would be possible to implement the present invention with almost any application, including, for example, the manufacture of flat panel displays, hard disk drives, medical devices, or any other article of manufacture or chemical, which uses controlled fluid flow. Additionally, the invention can be applied to a variety of industries such as medical, petroleum, environmental, chemical, biomedical, materials, or the like. Furthermore, a sensor assembly could be configured in different embodiments. For example, the heater coil could be used concurrently as a sensor coil, with appropriate circuitry, allowing the use of a single downstream sensor coil. Therefore, the above description and illustrations should not be taken as limiting the scope of the present invention which is defined by the appended claims.

What is claimed is:

1. A device for measuring the flow of gas, the device comprising:
    a sensor tube;
    a coil of wire, the wire having an end, the coil wound around the sensor tube;
    at least one terminal board, the sensor tube being disposed through the terminal board, the terminal board having at least one electrode wherein the end of the wire is electrically coupled to the electrode; and
    a first half plate attached to a first end of the sensor tube and a second half plate attached to a second end of the sensor tube.

2. The device of claim 1 wherein the wire comprises niachrome wire less than about 5 mils thick.

3. The device of claim 1 wherein the sensor tube is disposed through a plurality of terminal boards.

4. The device of claim 1 wherein the electrode is a solder pad and wherein the end of the wire is soldered to the electrode.

5. The device of claim 1 wherein the terminal board further includes a thermal insulating field between the sensor tube and the electrode.

6. The device of claim 2 wherein the terminal boards are attached to the sensor tube with an adhesive.

7. The device of claim 1 wherein the sensor tube comprises stainless steel tubing less than about 15 mils in outside diameter.

8. The device of claim 7 further comprising a form, the form being coupled to the first and second half plates and providing support for the terminal board.

9. The device of claim 8 wherein the form thermally isolates the sensor tube from a bypass of a mass flow controller.

10. The device of claim 1 further comprising a harness wire electrically coupled to the electrode.

11. A device for measuring the flow of gas, the device comprising:
    a sensor tube;
    a coil of wire, the wire having an end, the coil wound around the sensor tube;
    at least one terminal board, the sensor tube being disposed through the terminal board, the terminal board having at least one electrode, wherein the end of the wire is electrically coupled to the electrode; and
    a harness wire electrically coupled to the electrode;
    wherein the electrode comprises a first solder pad on a first side of the terminal board and a second solder pad on a second side of the terminal board, the first and second solder pads being electrically coupled, wherein the sensor coil wire is electrically coupled to the first solder pad and the harness wire is coupled to the second solder pad of the electrode.

12. The device of claim 11 wherein the first solder pad and the second solder pad are electrically coupled by a conductive via.

13. The device of claim 12 wherein the conductive via is a plated through-hole.

14. The device of claim 1 wherein the terminal board is essentially rectangular.

15. An apparatus for measuring the flow of gas in a mass flow controller, the device comprising:
    a sensor tube;
    a first half plate coupled to a first end of the sensor tube;
    a second half plate coupled to a second end of the sensor tube;
    a heater element coil wound around the sensor tube;
    a sensor element coil wound around the sensor tube;
    a plurality of terminal boards, the sensor tube disposed through each of the plurality of terminal boards; and
    a form connected to the first half plate and the second half plate and providing support to at least one of the plurality of terminal boards.

16. The apparatus of claim 15 further comprising a bypass, wherein the form provides thermal insulation between the bypass and the sensor tube.

17. The apparatus of claim 16 wherein the form comprises organic resin.

18. The apparatus of claim 17 further comprising reinforcing fibers.

19. The apparatus of claim 16 wherein the form is laminated, the laminations running between the bypass and the sensor tube.

20. The apparatus of claim 16 wherein the form is a composite of a first material having a first thermal conductivity formed around a second material having a second thermal conductivity, wherein the second thermal conductivity is lower than the first thermal conductivity.

21. The device of claim 11 wherein the wire comprises niachrome wire less than about 5 mils thick.

22. The device of claim 11 wherein the sensor tube is disposed through a plurality of terminal boards.

23. The device of claim 11 wherein the electrode is a solder pad and wherein the end of the wire is soldered to the electrode.

24. The device of claim 11 wherein the terminal board further includes a thermal insulating field between the sensor tube and the electrode.

25. The device of claim 11 wherein the sensor tube comprises stainless steel tubing less than about 15 mils in outside diameter.

26. The device of claim 11 wherein the terminal board is essentially rectangular.

* * * * *

UNITED STATES PATENT AND TRADEMARK OFFICE
CERTIFICATE OF CORRECTION

PATENT NO. : 6,062,077
DATED : May 16, 2000
INVENTOR(S) : Faramarz Azima

It is certified that two errors appear in the above-identified patent and that said Letters Patent is hereby corrected as shown below:

In claim 6, please delete "of claim 2" and insert --of claim 3--.

In claim 8, please delete "of claim 7" and insert --of claim 1--.

Signed and Sealed this

Seventeenth Day of April, 2001

NICHOLAS P. GODICI

*Attest:*

*Attesting Officer*     *Acting Director of the United States Patent and Trademark Office*